United States Patent Office 3,131,185
Patented Apr. 28, 1964

3,131,185
NICOTINIC ESTERS OF HYDROXYL DERIVATIVES OF THE PHENANTHRENIC ALKALOIDS OF OPIUM, AND PROCESS FOR THE PREPARATION OF THESE ESTERS
Louis Lafon, Paris, France, assignor to Societe Anonyme dite: Orsymonde, Paris, France
No Drawing. Filed Feb. 15, 1960, Ser. No. 8,534
Claims priority, application France Mar. 18, 1959
7 Claims. (Cl. 260—247.2)

Many derivatives of the phenanthrenic alkaloids of opium are known to possess a free hydroxyl function.

The present invention relates to nicotinic esters of such hydroxyl derivatives.

The present invention relates also to a process for the preparation of the nicotinic esters wherein the acyl radical of nicotinic acid is reacted with the hydroxyl function possessed by these derivatives.

According to a procedure provided by the process of the invention, nicotinyl chloride is reacted with the phenanthrentic derivative possessing a hydroxyl function, which is previously dissolved in a solvent such as pyridine.

The reaction temperature is kept below 30° C., and after adding in succession sodium bicarbonate followed by sodium carbonate, the oily product obtained is separated off. Finally, the resultant nicotinic ester is recrystallized.

According to another procedure provided by the process, nicotinic anhydride is reacted with the hydroxyl derivative of the phenanthrenic alkaloids, the reaction occurring at a temperature comprised within 100 and 160° C.

After adding in succession sodium bicarbonate and eventually sodium carbonate in excess, one proceeds as in the first procedure of the process with the separation of the resultant oily product.

Among the more useful derivatives of the phenanthrenic alkaloids, for the purpose of giving nicotinic esters according to the invention, the following materials can be mentioned:

Methylmorphine, or codeine, having the following formula:

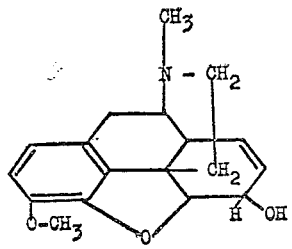

peronine, which is benzylmorphine hydrochloride.
Dihydromorphine, having the following formula:

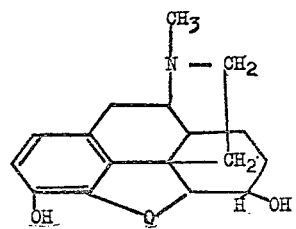

paramorphan, which is dihydromorphine hydrochloride, ethylmorphine, or codethyline.

Genomorphine, or morphine-N-oxide, having the following formula:

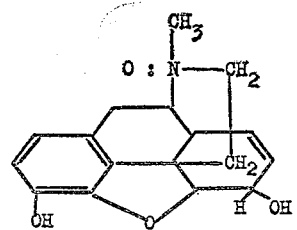

morphosan, or morphine methylbromide.
3-hydroxy-N-phenethyl-morphinan, having the following formula:

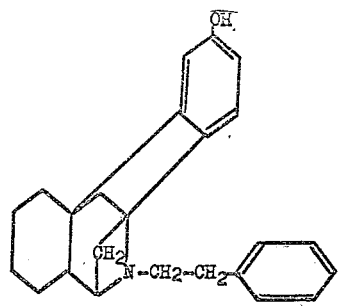

Pholcodine, or morpholinyl ethylmorphine, having the following formula:

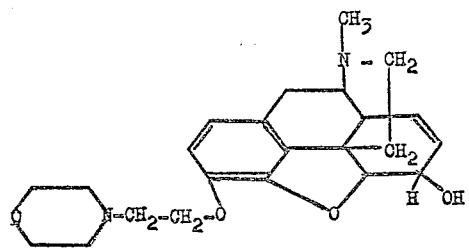

Dihydrocodeine, having the following formula:

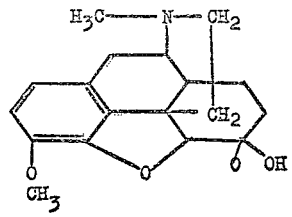

dromoran or 3-hydroxy-N-methylmorphine.

EXAMPLE 1

Nicotinic ester of codeine, having the following formula:

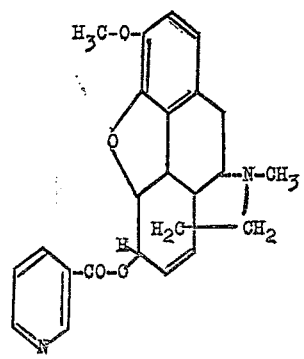

A first step consists in the preparation of nicotinyl chloride hydrochloride, having the following formula:

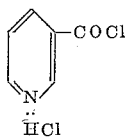

by heating 30 g. of nicotinic acid in a round-bottom flask, equipped with a reflux condenser, with 100 ml. of thionyl chloride. This is carried out for three hours, and the thionyl chloride is removed by vacuum distillation. The crystalline residue is washed several times with petroleum ether, it is then sucked almost dry and dried over sulfuric acid in a vacuum. 33 g. of product are obtained, representing a yield of 76%.

The nicotinic ester is then prepared from 6 g. of codeine dissolved in 35 g. of freshly distilled pyridine. The solution is ice-cooled and 15 g. of nicotinyl chloride are aded to it little by little, the inner temperature of the mixture being kept below 30° C.

The resultant mixture is allowed to stand for 6 to 8 hours at room temperature; it is then poured into ice-water. Sodium bicarbonate is added to the solution until there is no more evolution of gas on further addition of bicarbonate. Sodium carbonate is then added until no more turbidity is caused in the solution by a further addition of carbonate. A yellowish oil is separated, which soon crystallizes when scratched; after letting the oil stand in a refrigerator for 12 hours, the crystals are filtered off.

The resultant crystals are then redissolved in a minimum of hydrochloric acid diluted to 1/10, and the solution is brought to a boil with 2 g. activated charcoal. The resultant solution is filtered, and the filtrate is treated as previously described with sodium bicarbonate and carbonate.

The resultant crystals are sucked dry and are washed for a long time with water.

7.50 g. of nicotinic ester were obtained, representing a yield of 94%.

The resultant yellowish-white crystals are insoluble in water and soluble in alcohol and most organic solvents. They will dissolve in acid medium. Their melting point is 134–135° C.

10 ml. of deci-normal sodium hydroxide solution are added to 0.216 g. dissolved in 50 ml. of alcohol; the resultant mixture is refluxed for 20 minutes. After cooling, excess sodium hydroxide is determined against deci-normal sulfuric acid ($n$ ml.).

$$10 - n = 5.20 \text{ ml.}$$

representing: $5.20 \times 0.0403 = 0.200$ g. of ester corresponding to purity of the order of 97%.

The pharmacodynamic properties of the nicotinic ester of codeine obtained according to the above example were studied.

Acute toxicity on mice gave the following results:

The first tests were carried out by intraperitoneal administration on 30 female mice whose weights varied from 15 to 20 g., and it was established that the mean toxic dose, according to the method of Taintner and Miller, is 0.051 g.

On gastric administration, toxicity is noted to be 0.280 g.

The cardiovascular effects of the nicotinic ester were studied on anesthetized dogs, and hypotensive action was observed, on an average, the intravenous injection of 4 mg./kg. causes a drop of the carotid pressure to within 20–80% of the initial value, depending on the animal.

For the same dose, the nicotinic ester increases peristalsis and decreases both the respiratory rhythm and the respiratory amplitude.

Moreover, the anti-tussive effect of the nicotinic ester was studied on dogs under pento-barbital anesthesia. The inhibition of the response to a mechanical stimulus (introduction of a catheter in the trachea) and to a chemical stimulus (inhalation of ammonia) was studied. The anti-tussive effect was noticed to obtain with mean doses of 3.3 mg./kg.

The nicotinic ester of codeine possesses some analgetic action which it has been possible to observe by the method of Eddy. A 150 mg. dose is efficacious and protects 50% of the mice against conduction heat. The product gives Straub's reaction. It produces a very slight release of histaminic materials and its action on the gastrointestinal motility in rats is observable by the test meal (colored) method; at a dose of 15 mg./kg.; it reduces by 50% the transit time of a test meal (colored) as compared to that of the reference animals.

A study of the therapeutic properties of the nicotinic ester of codeine was also carried out; therefore, it was used in man in the form of tablets containing 0.04 g. to 0.06 g. of product. It has also been used in association with Desessartz' syrup.

Excellent results were observed in the treatment of cough.

EXAMPLE 2

*Acid Dimaleate of the Nicotinic ester of Pholcodine*

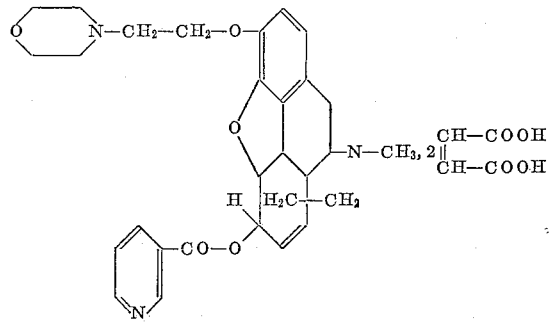

*First procedure.*—From nicotinyl chloride prepared as indicated in Example 1, and the nicotinic ester is prepared in the same way as the codeine ester from 10 g. of pholcodine (0.025 mole) 45 ml. of pyridine and 15 g. of nicotinyl chloride hydrochloride.

At the end of the preparation, the resultant yellowish oil concretes slowly over phosphoric acid in a vacuum.

A determination identical with that carried out in Example 1 showed that the purity of the ester was of the order of 98%.

*Second procedure, from nicotinic anhydride.*—Said nicotinic anhydride is prepared according to the method described by C. O. Badjett, J. Am. Chem. Soc. (1947) 69/2231.

Thus, it is prepared from 20.3 g. of nicotinic acid 100 ml. of anhydrous nitrobenzene, 20 g. of thionyl chloride and 26.6 g. of potassium nicotinate.

In order to prepare the nicotinic ester of pholcodine, 8.8 g. of pholcodine (0.022 mole) are added little by little to 13 g. of nicotinic anhydride molten by heating over an oil-bath. The mixture is heated for one hour at 130–140° C. and then cooled. 150 ml. of water are added, followed by about 7 g. of sodium bicarbonate, the mixture being slightly heated just so as to dissolve completely the excess anhydride in sodium salt form.

Excess sodium carbonate is added to the resultant solution until no precipitate appears upon further addition of this carbonate. The resultant oil is separated and decanted off. It is then redissolved in hydrochloric acid at 1/10, and the resultant solution is heated with 2 g. of activated charcoal. The resultant solution is filtered.

The filtrate is treated as previously described with sodium bicarbonate followed by sodium carbonate. The resultant oily precipitate is chloroform-extracted, and the aqueous solution is also shaken with chloroform which is added to that already used.

The chloroform solution is dried for 12 hours over sodium sulfate and is used, after filtration, for the preparation of the acid dimaleate of the nicotinic ester.

For this preparation, 5.10 g. of maleic acid are dissolved in a minimum of hot ethyl acetate, and the resultant solution is added to the chloroform solution prepared previously. An oily precipitate separates immediately, which soon concretes when scratched. After standing overnight in the refrigerator, the precipitate is sucked dry and washed for a long time with ethyl acetate. It is then recrystallized from a minimum of acetone.

12 g. are obtained, representing a yield of 73%.

When this dimaleate is prepared from nicotinyl chloride, 8 g. are obtained, representing a yield of 42%.

The yellowish-white crystals are very soluble in water, soluble in alcohol and acetone in the hot, and insoluble in the other organic solvents.

The aqueous solution has an acid reaction to colored indicators. The melting point is 128–129° C.

Determination of the maleic acid is carried out from 0.136 g. of product dissolved in 100 ml. of distilled water and titrated against deci-normal sodium hydroxide, in the presence of phenolphtalein. 7.20 ml. of deci-normal sodium hydroxide are necessary, representing $$\frac{7.2 \times 0.0058 \times 100}{0.136} = 30.70\% \text{ of maleic acid}$$

the theoretical giving 30.6%.

Determination is carried out by saponification, by adding to the above solution 10 ml. of deci-normal sodium hydroxide and refluxing for 15 minutes. Excess sodium hydroxide is determined against deci-normal sulfuric acid ($n$/ml.).

$$10 - n = 1.80 \text{ ml.}$$

representing $1.8 \times 0.0758 = 0.1361$ g. of ester, corresponding to purity close to 100%.

A pharmacodynamic study of the acid dimaleate of the nicotinic ester of pholcodine was carried out.

On intraperitoneal administration, the mean toxic dose in mice is 0.255 g./kg.; on gastric administration it is 0.940 g./kg.

The product was noticed to exert a hypotensive action on anesthetized dogs, on intravenous injection of 4 mg./kg. For the same dose, it produces an increase of the respiratory rhythm and a decrease of the respiratory amplitude of the dog.

The dimaleate decreases the spontaneous motility in mice upon subcutaneous administration of 100 to 400 mg./kg.

On intravenous injection of 2 to 8 mg./kg., the product was noticed to exert an excellent anti-tussive action on cats. On intravenous injections of 4 mg./kg., it produces a release of antihistaminic substances.

Moreover, a study of its therapeutic effects was carried out following the procedure used for the product studied in Example 1; in the same doses as the latter product, it proved active in the treatment of cough, it was not constipating and did not induce habit.

EXAMPLE 3

*Acid Dimaleate of the Nicotinic Ester of Dihydrocodeine*

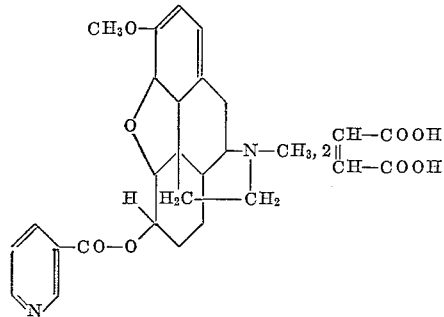

So as to prepare first the ester, a mixture containing 2.5 g. of dihydrocodeine and 4 g. of nicotinic anhydride is heated for 2 hours over the oil-bath at 130° C., with constant stirring. The mass is allowed to cool and is then taken up with water, in the hot. Sodium bicarbonate and sodium carbonate are then added, until no precipitate occurs on further addition of carbonate.

The resultant precipitate is redissolved in chloroform which is also used for extracting the aqueous solution; the chloroform solution is extracted with a 10% hydrochloric acid solution.

Sodium carbonate is added to the resultant solution giving the precipitated nicotinic ester. Thus, a resin is obtained, which concretes when scratched, and which may be purified by proceeding again as described above.

The yield of the preparation is 62%. The nicotinic ester obtained is in the form of buff-colored crystals sparingly soluble in water, insoluble in alkaline solutions, and soluble in dilute hydrochloric acid, in chloroform, ether, alcohol, benzene and ethyl acetate. Their melting point is 145° C. Analysis of the saponification number of these esters gives 140, theoretical giving 137.

The acid dimaleate is prepared from the resultant ester by dissolving 2 g. of the ester (0.005 mole) in a minimum of hot ethyl acetate and adding 0.12 g. of maleic acid (0.01 mole) in solution in ethyl acetate.

An oily precipitate separated after cooling. It crystallizes slowly when scratched, and it may be recrystallized from hot acetone. The yield of this reaction is 70%.

The acid dimaleate is in the form of a very hygroscopic buff-colored powder. Determination of the maleic acid gives 40.5%, while theoretical gives 44%.

Pharmacodynamic studies of the acid dimaleate of the nicotinic ester of dihydrocodeine were carried out; the product was noticed to be a good antitussive, and to possess besides certain analgetic properties. Also, the analgetic effect of the association of this product with acetylsalicylic acid was studied.

Therefore, comparative tests were carried out using the product alone, the product associated with acetylsalicylic acid and acetylsalicylic acid alone, with the phenylquinone test.

Experiments were carried out on 260 female mice of the Webster race, whose weights varied from 15 to 25 g.

The following combinations were used in these experiments:

50 mg. of dimaleate+250 mg. of acetylsalicylic acid
100 mg. of dimaleate+250 mg. of acetylsalicylic acid
150 mg. of dimaleate+250 mg. of acetylsalicylic acid
200 mg. of dimaleate+250 mg. of acetylsalicylic acid The first combination caused a significant increase of the analgetic effect which changed in duration from 120 to 160 minutes. However, neither potentialization nor addition of effects were observed.

The other combinations gave less clear and less conclusive results. However, in none of the cases were toxic phenomena observed.

With the same combinations, similar studies were carried out using the test of Eddy.

Tests were carried out on 120 female mice of the Webster race, whose weights varied from 15 to 20 g.

Whereas acetylsalicylic acid alone, no matter the dose used, does not protect the mice against the painful stimulus produced by heat, the dimaleate used alone protects the mice at doses of 100, 150 and 200 mg./kg.

Moreover, the combination of 100 mg. of dimaleate with 250 mg. of acetylsalicylic acid produces a higher protective effect and of longer duration.

The association of 50 mg. of dimaleate with 300 mg. of acetylsalicylic acid exerted a still more important analgetic effect which lasted up to 220 minutes.

The study was pursued on rat by producing a painful stimulus to radiant heat.

60 rats were used for these tests; 25 of them were tested with the dimaleate alone; 25 were tested with the dimaleate used in association with acetylsalicylic acid; and 10 were tested with codeine alone.

The analgetic effect was noticed to be identical for the three lots. However, while the analgetic effect of codeine lasts only 60 minutes, the effect of the dimaleate extends to 105 minutes, and the effect of the dimaleate-acetylsalicylic acid association extends to 165 minutes.

Finally, the therapeutic effects of the acid dimaleate of the nicotinic ester of dihydrocodeine were studied, and it was noticed that it had good antitussive properties on man at doses of 0.02 to 0.04 g. used in the form of tablets, of cachets, or in association with a syrup.

In particular, the following formulas were used for these tests:

|  | G. |
|---|---|
| Dimaleate | 0.005 |
| Acetylsalicylic acid | 0.25 | for a cachet or a tablet;

| Dimaleate | 0.01 |
|---|---|
| Acetylsalicylic acid | 0.25 | for a cachet or a tablet;

| Dimaleate | 0.01 |
|---|---|
| Acetylsalicylic acid | 0.40 | for a cachet or a tablet.

EXAMPLE 4

*Nicotinic Diester of Dimethyl-Papaveroline*

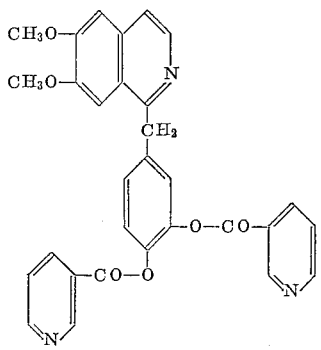

The dimethyl-papaveroline hydrochloride was prepared first. Therefore, 5 g. of papaveroline hydrochloride and 25 ml. of concentrated hydrochloric acid were placed in a 500 ml. round-bottom flask. After refluxing for 9 hours, the solution was allowed to cool in the refrigerator. The solution separates into two layers: a top layer consisting in excess acid which is discarded, and a resinous bottom layer. This bottom layer is evaporated under vacuum over the water-bath at a temperature up to 75° C. The resultant solid yellow mass is taken up in acetone. The resultant solution is filtered and evacuated over the water-bath. Thus, 4.10 g. of dimethyl-papaveroline hydrochloride are obtained, representing a yield of 90%.

This product is in the form of yellow crystals which are very soluble in water and in alcohol, less soluble in ether, chloroform and acetone. Their melting point is 170° C.

This salt is fairly unstable and, in contact with air, it oxidizes and gives a resin. An aqueous solution of this salt to which ferric chloride is added gives a very deep purplish-brown color.

The nicotinic diester of dimethyl papaveroline was then prepared.

Therefore, 10 g. of the hydrochloride obtained as indicated above were heated with 20 g. of nicotinic anhydride in a beaker, at a temperature ranging within 130 and 140° C., for one hour and a half, under constant stirring. The resultant red material finally forms a brownish paste. The mixture is allowed to cool and it is dissolved in water to which a sufficient amount of sodium carbonate has been added so as to obtain complete dissolution of the excess nicotinic anhydride.

The resultant aqueous layer is separated, and the resinous layer containing the ester is dissolved in a 10% hydrochloric acid solution. Excess sodium carbonate is added to this solution, causing precipitation of a red-brown resin which concretes slowly when scratched. The resultant product is purified by dissolution in a hydrochloric acid solution and precipitation with sodium carbonate.

The resultant nicotinic diester is in the form of greenish-yellow crystals which are insoluble in water, soluble in acid medium, soluble in alcohol and in ethyl acetate, sparingly soluble in ether and in benzene. Their melting point is 110–112° C.

An acid dimaleate can be obtained from this ester by preparing this acid dimaleate in an ethyl acetate solution.

The nicotinic diester in solution in dilute alcohol does not give sensible coloration with ferric chloride.

The analysis of its saponification number gives the value 205, whereas theoretical gives 215.

A pharmacodynamic study of the dinicotinic ester obtained according to this example was carried out.

Intraperitoneal toxicity was determined on 48 female mice of the Webster race, whose weights varied from 17 to 25 g. and who had not fasted previously.

The lethal dose determined after the method of Miller and Taintner is 0.510 g./kg.

A marked coronary vaso-dilator action is noticed when using the method of perfusion of the isolated heart of the rabbit, according to Langendorff's method.

A spasmolytic effect on the isolated intestine of rat has also been observed, using Magnus' method for perfusing the duodenum of rat and observing a relaxation of the spasm produced by baryum chloride.

This antispasmodic effect has been confirmed by studying it in situ in the duodenum of the dog, using the classical method of the balloon. On intravenous injection, 5 to 9 mg./kg. of the dinicotinic ester lifts the spasm caused by the injection of baryum chloride in the anesthetized dog submitted to artificial respiration.

Moreover, a clear hypotensive action has been noticed on normotensive dogs under chloralose, on intravenous injection of the product at doses of 3 to 5 mg./kg.

Finally, the therapeutic effects of the product were studied, using tablets containing 10 to 20 mg. of product. The product proved a good antispasmodic, especially indicated in gastrointestinal spasms.

In the latter case, the association of the dinicotinic ester with dihydroxyaluminum allantoinate in equal doses of 0.20 to 0.50 g. per tablet or per cachet gave excellent results.

What I claim is:

1. Acid dimaleate of the nicotinic ester of pholcodine.
2. Acid dimaleate of the nicotinic ester of dihydrocodeine.
3. Nicotinic diester of dimethylpapaveroline.

4. The nicotinic ester of codeine, of the formula

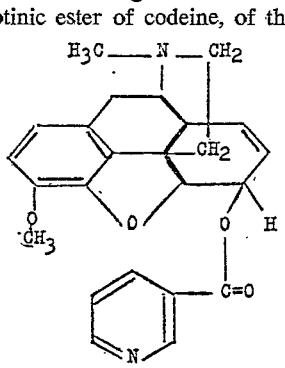

5. A member selected from the group consisting of: (a) the nicotinic acid esters of codeine, dihydrocodeine, pholcodine and the nicotinic acid diester of dimethylpapaveroline, and (b) the acid addition salts of (a) with a pharmaceutically acceptable acid.

6. The nicotinic acid ester of pholcodine.
7. The nicotinic acid ester of dihydrocodeine.

References Cited in the file of this patent

UNITED STATES PATENTS 2,821,531   Brown _____ Jan. 28, 1958
2,878,253   Zirm _____ Mar. 17, 1959

OTHER REFERENCES

Boucherle et al.: Bull. Soc. Chim., France, pp. 1222–1224 (1960).

Zirm et al.: Monatshefte für Chemie, vol. 88, pages 330–335 (1957).